US010346867B2

(12) United States Patent
Faith et al.

(10) Patent No.: US 10,346,867 B2
(45) Date of Patent: Jul. 9, 2019

(54) INTENTS FOR OFFER-DISCOVERY SYSTEMS

(71) Applicant: RetailMeNot, Inc., Austin, TX (US)

(72) Inventors: John Newman Faith, Austin, TX (US); Matthew Alan Howitt, Austin, TX (US); Eithan Zilkha, Austin, TX (US)

(73) Assignee: RetailMeNot, Inc., Austin, TX (US)

( * ) Notice: Subject to any disclaimer, the term of this patent is extended or adjusted under 35 U.S.C. 154(b) by 1410 days.

(21) Appl. No.: 13/836,808

(22) Filed: Mar. 15, 2013

(65) Prior Publication Data

US 2013/0332277 A1 Dec. 12, 2013

Related U.S. Application Data

(60) Provisional application No. 61/707,527, filed on Sep. 28, 2012, provisional application No. 61/665,740, (Continued)

(51) Int. Cl.
*G06Q 30/00* (2012.01)
*G06Q 30/02* (2012.01)
*H04L 29/08* (2006.01)

(52) U.S. Cl.
CPC ......... *G06Q 30/0222* (2013.01); *G06Q 30/02* (2013.01); *G06Q 30/0225* (2013.01); (Continued)

(58) Field of Classification Search
CPC .................................................. G06Q 30/0207
(Continued)

(56) References Cited

U.S. PATENT DOCUMENTS

| 6,433,801 | B1 | 8/2002 | Moon et al. |
| 2002/0010623 | A1 | 1/2002 | McCollom et al. |

(Continued)

FOREIGN PATENT DOCUMENTS

| AU | 2012200475 A1 | 2/2012 |
| WO | WO0041121 A1 | 7/2000 |

(Continued)

OTHER PUBLICATIONS

'Coupon Codes | MailChimp', http://mailchimp.com/features/coupon-codes/, Feb. 13, 2014, pp. 1-3.
(Continued)

*Primary Examiner* — Matthew L Hamilton
(74) *Attorney, Agent, or Firm* — Pillsbury Winthrop Shaw Pittman LLP

(57) ABSTRACT

Provided is a process of identifying an offers engine configured to provide information about offers to users, the method including: receiving, at an offers engine, a request for an offers interface website from a mobile computing device; and in response to the request, transmitting to the mobile computing device a website configured to cause a browser of the mobile computing device to perform steps, including: detecting an offers intent in the transmitted website; retrieving from memory of the mobile computing device an identifier of a native application offers interface mapped to the offers intent; and in response to retrieving the identifier of the offers engine, launching the native application, the native application being stored in memory of the mobile computing device and configured to provide an offers interface to the offers engine.

11 Claims, 5 Drawing Sheets

Related U.S. Application Data filed on Jun. 28, 2012, provisional application No. 61/658,408, filed on Jun. 12, 2012, provisional application No. 61/658,404, filed on Jun. 11, 2012, provisional application No. 61/658,387, filed on Jun. 11, 2012.

(52) U.S. Cl.
CPC ..... *G06Q 30/0239* (2013.01); *G06Q 30/0242* (2013.01); *G06Q 30/0255* (2013.01); *G06Q 30/0256* (2013.01); *G06Q 30/0267* (2013.01); *G06Q 30/0269* (2013.01); *H04L 67/02* (2013.01)

(58) Field of Classification Search
USPC .......................................................... 705/14
See application file for complete search history.

(56) References Cited

U.S. PATENT DOCUMENTS

| | | |
|---|---|---|
| 2003/0005448 A1 | 1/2003 | Axelsson et al. |
| 2004/0003042 A1 | 1/2004 | Horvitz et al. |
| 2007/0244746 A1 | 10/2007 | Issen et al. |
| 2008/0010137 A1* | 1/2008 | Ho et al. ............... 705/14 |
| 2008/0052180 A1* | 2/2008 | Lawhorn ............... 705/26 |
| 2008/0176528 A1 | 7/2008 | Kim |
| 2008/0294588 A1 | 11/2008 | Morris et al. |
| 2009/0030794 A1 | 1/2009 | Scheflan et al. |
| 2009/0248505 A1 | 10/2009 | Finkelstein et al. |
| 2011/0010235 A1 | 1/2011 | Kenny |
| 2011/0029363 A1 | 2/2011 | Gillenson et al. |
| 2011/0066636 A1 | 3/2011 | Guido et al. |
| 2011/0153401 A1 | 6/2011 | Jellema et al. |
| 2011/0178867 A1 | 7/2011 | King |
| 2011/0191160 A1 | 8/2011 | Blackhurst et al. |
| 2011/0197237 A1 | 8/2011 | Turner |
| 2011/0238474 A1 | 9/2011 | Carr et al. |
| 2011/0243553 A1 | 10/2011 | Russell |
| 2011/0251897 A1 | 10/2011 | Litvack et al. |
| 2011/0270667 A1 | 11/2011 | Kenny |
| 2011/0270690 A1 | 11/2011 | Martin-Cocher et al. |
| 2011/0288917 A1 | 11/2011 | Wanek et al. |
| 2012/0010938 A1 | 1/2012 | Standley et al. |
| 2012/0036015 A1 | 2/2012 | Sheikh |
| 2012/0116859 A1 | 5/2012 | Bone |
| 2012/0143671 A1 | 6/2012 | Hansen et al. |
| 2012/0143680 A1 | 6/2012 | Hansen et al. |
| 2012/0143720 A1 | 6/2012 | Moser |
| 2012/0209686 A1 | 8/2012 | Horowitz et al. |
| 2012/0220277 A1 | 8/2012 | Gonynor |
| 2012/0266079 A1 | 10/2012 | Lee et al. |
| 2012/0284107 A1 | 11/2012 | Gernaat et al. |
| 2012/0295645 A1 | 11/2012 | Yariv et al. |
| 2012/0310826 A1 | 12/2012 | Chatterjee |
| 2013/0006727 A1 | 1/2013 | Hoag et al. |
| 2013/0024267 A1* | 1/2013 | Libenson et al. ......... 705/14.38 |
| 2013/0041737 A1 | 2/2013 | Mishra et al. |
| 2013/0117646 A1 | 5/2013 | Hansen et al. |
| 2013/0188217 A1 | 7/2013 | Kluth |
| 2013/0282533 A1* | 10/2013 | Foran-Owens et al. ..... 705/27.1 |

FOREIGN PATENT DOCUMENTS

| | | |
|---|---|---|
| WO | 2011094734 A2 | 8/2011 |
| WO | 2012061758 A2 | 5/2012 |

OTHER PUBLICATIONS

'Coupon codes and discounts for 90,000 online stores!', https://web.archive.org/web/20110609064014/http://www.retailmenot.com/, Jun. 9, 2011, pp. 1-3.
'Coupon Codes, Coupons, Promo Codes, Free Shipping and Discounts for Thousands of Stores', https://web.archive.org/web/20120606222824/http://www.retailmenot.com/, Jun. 6, 2012, pp. 1-4.
'Now You Can Finally Launch a Groupon Deal Without Ever Talking to a Human', http://recode.net/2014/02/10/now-you-can-launch-a-groupon-deal-without-ever-talking-to-a-human/, Feb. 10, 2014, pp. 1-6.
'QuikCoupon App—Coupon App for the iPhone', http://www.quikcoupon-app.com/, Feb. 13, 2014, pp. 1-3.
International Preliminary Report on Patentability for PCT/US2013/045132, dated Dec. 16, 2014, pp. 1-9.
International Preliminary Report on Patentability for PCT/US2013/045135, dated Dec. 16, 2014, pp. 1-10.
International Preliminary Report on Patentability for PCT/US2013/045143, dated Dec. 16, 2014, pp. 1-10.
International Preliminary Report on Patentability for PCT/US2013/045145, dated Dec. 16, 2014, pp. 1-10.
International Preliminary Report on Patentability for PCT/US2013/045186, dated Dec. 16, 2014, pp. 1.
International Preliminary Report on Patentability for PCT/US2013/45139, dated Dec. 16, 2014, pp. 1-10.
International Search Report and Written Opinion for Related PCT Application PCT/US2014/029953, dated Jul. 18, 2014, pp. 1-11.
International Search Report & Written Opinion for PCT App. No. PCT/US2013/045143, dated Oct. 25, 2013. (pp. 1-13).
International Search Report & Written Opinion for PCT App. No. PCT/US2013/045145, dated Oct. 25, 2013. (pp. 1-13).
International Search Report & Written Opinion for PCT App. No. PCT/US2013/045132, dated Oct. 30, 2013. (pp. 1-12).
International Search Report & Written Opinion for PCT App. No. PCT/US2013/045135, dated Nov. 4, 2013. (pp. 1-13).
International Search Report & Written Opinion for PCT App. No. PCT/US2013/045139, dated Nov. 11, 2013. (pp. 1-13).
International Search Report & Written Opinion for PCT App. No. PCT/US2013/045186, dated Nov. 14, 2013. (pp. 1-12).
http://web.archive.org/web/20120503225532/http:/www.retailmenot.com/.
http://web.archive.org/web/20110506114908/http:/www.retailmenot.com.

\* cited by examiner

INTENTS FOR OFFER-DISCOVERY SYSTEMS

CROSS-REFERENCE TO RELATED APPLICATIONS

The present application is a non-provisional of, and thus claims the benefit of, each of the following U.S. provisional patent applications, each of which is hereby incorporated by reference in its entirety for all purposes: provisional application 61/707,527, filed Sep. 28, 2012; provisional application 61/665,740, filed Jun. 28, 2012; provisional application 61/658,408, filed Jun. 12, 2012; provisional application 61/658,404, filed Jun. 11, 2012; and provisional application 61/658,387, filed Jun. 11, 2012.

BACKGROUND OF THE INVENTION

1. Field of the Invention

The present invention relates generally to merchant offers and, more specifically, to offer-discovery systems.

2. Description of the Related Art

Offer-discovery systems provide a service by which merchants inform customers of offers, for example deals (like discounts, favorable shipping terms, or rebates) or coupons (like printable coupons for in-store use or coupon codes for use online). Typically, the systems store information about offers from a relatively large number of merchants and provide an interface by which customers can identify offers in which the customer is interested. Merchants have found the deal-discovery systems to be a relatively effective form of marketing, as cost-sensitive consumers are drawn to such systems due to the system's relatively comprehensive listing of offers, and as a result, the number of offers listed on such systems has increased in recent years. One consequence of this increase is that users (e.g., prospective customers of the merchants) face an increasingly complex task of identifying relevant offers on offer-discovery systems and recalling information about the offer when making a purchase, potentially sometime in the future after first discovering the offer, and potentially in different instances of a browser window or on a different computing device.

Adding to the complexity faced by users is the existence of multiple offer-discovery systems in which the user may choose to participate. To search for relevant offers, users often navigate to a specific offer-discovery system preferred by that user before searching for offers, a task which can add several steps to the process of identifying relevant offers and can discourage users from searching for offers.

SUMMARY OF THE INVENTION

The following is a non-exhaustive listing of some aspects of the present techniques. These and other aspects are described in the following disclosure.

In some aspects, the present invention includes a process of operating an offers engine configured to provide information about offers to users, the method including: receiving, at an offers engine, a request for an offers interface website from a mobile computing device; and in response to the request, transmitting to the mobile computing device a website configured to cause a browser of the mobile computing device to perform steps, including: detecting an offers intent in the transmitted website; retrieving from memory of the mobile computing device an identifier of a native application offers interface mapped to the offers intent; and in response to retrieving the identifier of the offers engine, launching the native application, the native application being stored in memory of the mobile computing device and configured to provide an offers interface to the offers engine.

Some aspects include a process of searching for online coupons, the method including: navigating, at a user computing device, to a webpage; ascertaining, at the computing device, that the webpage contains an offers intent token indicating an offers intent by parsing the webpage with a browser, the offers intent identifying a class of services by which online coupons are searched using an offers engine accessible over the Internet; ascertaining, at the computing device, that an offers engine is mapped to the offers intent by obtaining from memory of the user computing device an identifier of a mapped offers engine, the mapped offers engine being previously mapped to the offers intent on the computing device; instantiating, on the user computing device, in response to ascertaining that an offers engine is mapped, an offers interface. The offers interface being configured to communicate with the offers engine by: receiving from the user a search query for coupons stored on the offers engine; transmitting the search query to the mapped offers engine; receiving coupons responsive to the search query from the mapped offers engine; and displaying the received coupons to the user on the offers interface, the displayed coupons being selectable by a user and operable to cause the user device, in response to the selection, to navigate to a merchant webpage associated with the selected coupon.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
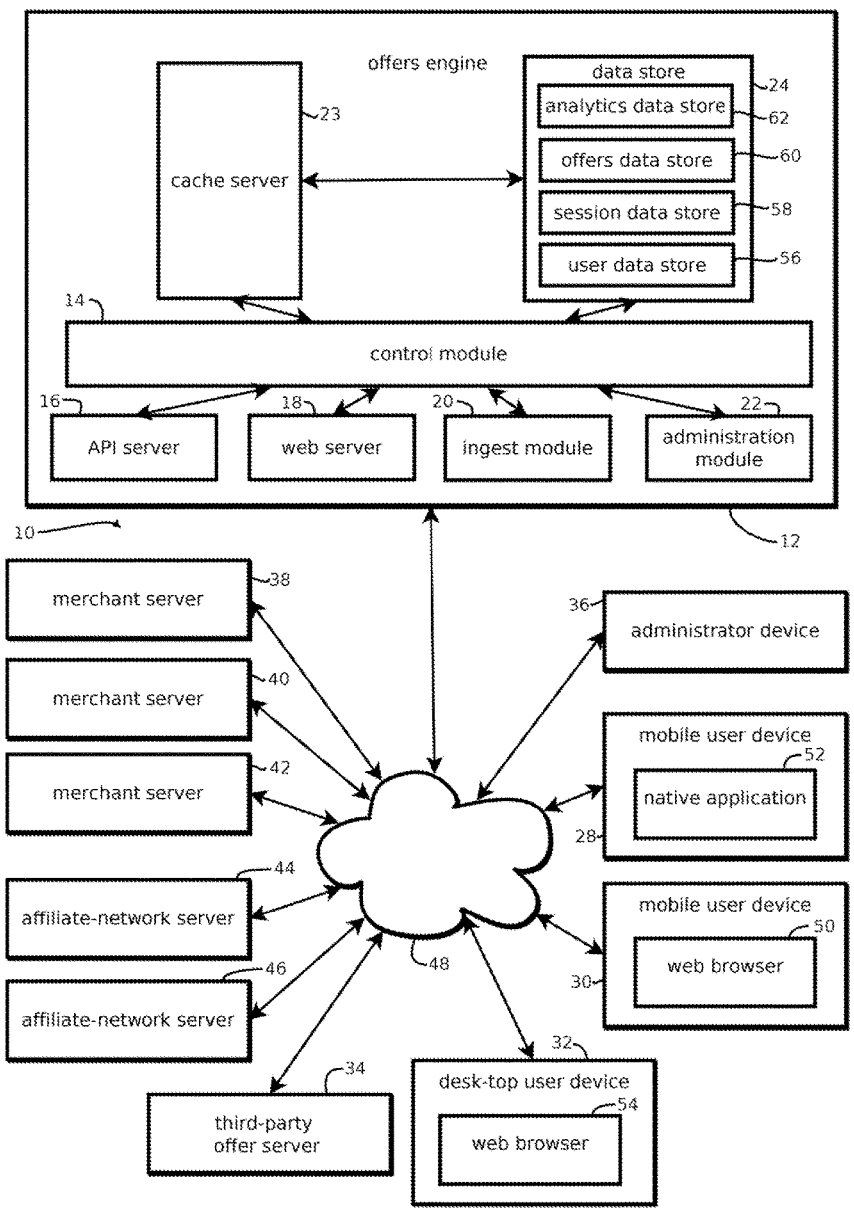
FIG. 1 illustrates an example of an offer-discovery system in accordance with some embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

The above-mentioned deficiencies in existing offer-discovery systems may be mitigated by certain embodiments of an offer-discovery system 10 illustrated by FIG. 1, and in particular, by variants of this system described below with reference to FIGS. 4-5, which are capable of detecting the presence (or selection) of a token indicating that an offers intent (identifying offers-related services to be engaged) is relevant to a webpage (or other content), and in response, instantiating an offers interface with the preferred offers engine of the user, thereby relieving the user of the burden of repeatedly selecting or navigating to their preferred offers engine.

FIG. 1 shows an embodiment of an offer-discovery system 10. The exemplary system 10 includes an offers engine 12 that, in some embodiments, is capable of reducing the burden on users attempting to identify offers relevant to them from among a relatively large pool of offers (e.g., more than 100, more than 1,000, or more than 10,000). To this end and others, the offers engine 12 maintains device-independent user profiles (or portions of user profiles) by which offers interfaces may be relatively consistently configured across multiple user devices with which the user interacts with the offers engine 12. Further, the offers engine 12, in some embodiments, includes a number of features expected to facilitate relatively quick identification of relevant offers by a user, features that include cached storage of data related to likely relevant offers, faceted presentation of offers by which users can select among offers within various categories, and a number of other techniques described below for assisting with offer identification. The offers engine 12 is also expected to facilitate relatively low operating costs by, in some embodiments, automating parts of the process by which offer related data is acquired from sources, such as affiliate networks merchants, administrators, or users, and automating parts of the process by which transaction data indicative of acceptance, settlement, or clearing of offers is obtained and processed.

These and other benefits are described in greater detail below, after introducing the components of the system 10 and describing their operation. It should be noted, however, that not all embodiments necessarily provide all of the benefits outlined herein, and some embodiments may provide all or a subset of these benefits or different benefits, as various engineering and cost tradeoffs are envisioned.

In the illustrated embodiment, the offers engine 12 includes a control module 14, an application program interface (API) server 16, a web server 18, an ingest module 20, an administration module 22, a data store 24, and a cache server 23. These components, in some embodiments, communicate with one another in order to provide the functionality of the offers engine 12 described herein. As described in greater detail below, in some embodiments, the data store 24 may store data about offers and users' interactions with those offers; the cache server 23 may expedite access to this data by storing likely relevant data in relatively high-speed memory, for example, in random-access memory or a solid-state drive; the web server 18 may serve webpages having offers interfaces by which users discover relevant offers; the API server 16 may serve data to various applications that process data related to offers; the ingest module 20 may facilitate the intake of data related to offers from affiliate networks, users, administrators, and merchants; and the administration module 22 may facilitate curation of offers presented by the API server 16 and the web server 18. The operation of these components 16, 18, 20, 22, 24, and 23 may be coordinated by the control module 14, which may bidirectionally communicate with each of these components or direct the components to communicate with one another. Communication may occur by transmitting data between separate computing devices (e.g., via transmission control protocol/internet protocol (TCP/IP) communication over a network), by transmitting data between separate applications or processes on one computing device; or by passing values to and from functions, modules, or objects within an application or process, e.g., by reference or by value.

Among other operations, the offers engine 12 of this embodiment presents offers to users; receives data from users about their interaction with the offers (for example, the user's favorite offers or offer attributes; statistics about the offers the user has identified, accepted, or otherwise provided data about; or the identity of other users with whom the user communicates about offers and the content of those communications; provided that users opt to have such data obtained); customizes the presentation of offers based on this received data; and facilitates the processing of compensation from merchants (either directly or through affiliate networks) as a result of users accepting (or taking a specific action, like clicking or viewing, in some embodiments or use cases) offers. This interaction with users may occur via a website viewed on a desktop computer, tablet, or a laptop of the user. And in some cases, such interaction occurs via a mobile website viewed on a smart phone, tablet, or other mobile user device, or via a special-purpose native application executing on a smart phone, tablet, or other mobile user device. Presenting and facilitating interaction with offers across a variety of devices is expected to make it easier for users to identify and recall relevant offers at the time the user is interested in those offers, which is often different from the time at which the user first discovers the offers. In particular, some embodiments allow users to store data indicative of offers relevant to that user using one device, such as a desktop computer in the user's home, and then view those offers at a later time, such as on a native mobile application when in a retail store.

To illustrate an example of the environment in which the offers engine 12 operates, the illustrated embodiment of FIG. 1 includes a number of components with which the offers engine 12 communicates: mobile user devices 28 and 30; a desk-top user device 32; a third party offer server 34; an administrator device 36; merchant servers 38, 40, and 42; and affiliate-network servers 44 and 46. Each of these devices communicates with the offers engine 12 via a network 48, such as the Internet or the Internet in combination with various other networks, like local area networks, cellular networks, or personal area networks.

The mobile user devices 28 and 30 may be smart phones, tablets, gaming devices, or other hand-held networked computing devices having a display, a user input device (e.g., buttons, keys, voice recognition, or a single or multi-touch touchscreen), memory (such as a tangible, machine-readable, non-transitory memory), a network interface, a portable energy source (e.g., a battery), and a processor (a term which, as used herein, includes one or more processors) coupled to each of these components. The memory of the mobile user devices 28 and 30 may store instructions that when executed by the associated processor provide an operating system and various applications, including a web browser 50 or a native mobile application 52. The native application 52, in some embodiments, is operative to provide an offers interface that communicates with the offers engine 12 and facilitates user interaction with data from the offers engine 12. Similarly, the web browser 50 may be configured to receive a website from the offers engine 12 having data related to deals and instructions (for example, instructions expressed in JavaScript™) that when executed by the browser (which is executed by the processor) cause the mobile user device to communicate with the offers engine 12 and facilitate user interaction with data from the offers engine 12. The native application 52, and the web browser 50 upon rendering a webpage from the offers engine 12, may generally be referred to as client applications of the offers engine 12, which in some embodiments may be referred to as a server. Embodiments, however, are not limited to client/server architectures, and the offers engine 12, as illustrated, may include a variety of components other than those functioning primarily as a server.

The desk-top user device 32 may also include a web browser 54 that serves the same or similar role as the web browser 50 in the mobile user device 30. In addition, the desk-top user device 32 may include a monitor; a keyboard; a mouse; memory; a processor; and a tangible, non-transitory, machine-readable memory storing instructions that when executed by the processor provide an operating system and the web browser.

Third-party offer server 34 may be configured to embed data from the offers engine 12 in websites or other services provided by the third-party offer server 34. For example, third-party offer server 34 may be a server of a social networking service upon which users post comments or statistics about offers with which the user has interacted, or the users may use the offer server 34 to recommend offers to others or identify offers to avoid. In another example, third-party offer server 34 may include various services for publishing content to the Web, such as blogs, tweets, likes, dislikes, ratings, and the like. In another example, third-party offer server 34 provides services by which third-parties curate offers hosted by the offers engine 12.

Merchant servers 38, 40, and 42 host websites or other user accessible content interfaces by which users can accept offers hosted by the offers engine 12. In some embodiments, and in some use cases, the merchant servers 38, 40, and 42 host retail websites that present a plurality of items for sale by the merchant, a subset of which may include items to which offers apply, thereby generally making the item for sale more desirable to cost-sensitive consumers than under the terms presented by the merchant in the absence of the offer. For example, the offers may include free or discounted shipping, a discounted price, a bulk discount, a rebate, a referral award, or a coupon, such as a coupon acceptable by presenting a coupon code during checkout on the merchant website, or a printable or displayable coupon (e.g., on the screen of a mobile device) for in-store use, the printable or otherwise displayable coupon having, in some cases, a machine readable code (e.g., a bar code or QR code for display and scanning, or a code passed via near-field communication or Bluetooth™). In some embodiments, the merchant website includes a checkout webpage having an interface for the user to enter payment information and a coupon code, and the merchant website (either with logic on the client side or the server-side) may validate the coupon code entered by the user and, upon determining that the coupon code is valid, adjust the terms presented to the user for acceptance in accordance with the offer.

Some merchants may limit the number of uses of a given coupon, limit the duration over which the coupon is valid, or apply other conditions to use of the coupon, each of which may add to the burden faced by users seeking to find valid coupons applicable to an item the user wishes to purchase. As noted above, some embodiments of the offers engine 12 are expected to mitigate this burden.

Further, in some embodiments, the merchant servers 38, 40, and 42 provide data about offers to the offers engine 12 or (i.e., and/or, as used herein, unless otherwise indicated) data about transactions involving offers. In use cases in which the operator of the offers engine 12 has a direct affiliate-marketing relationship with one of the merchants of the merchant servers 38, 40, or 42, the transaction data may provide the basis for payments by the merchant directly to the operator of the offers engine 12. For example, payments may be based on a percentage of transactions to which offers were applied, a number of sales to which offers were applied, or a number of users who viewed or selected or otherwise interacted with an offer by the merchant.

Affiliate-network servers 44 and 46, in some embodiments and some use cases, are engaged when the entity operating the offers engine 12 does not have a direct affiliate-marketing relationship with the merchant making a given offer. In many affiliate marketing programs, merchants compensate outside entities, such as third-party publishers, for certain activities related to sales by that merchant and spurred by the outside entity. For example, in some affiliate marketing programs, merchants compensate an affiliate, such as the entity operating the offers engine 12, in cases in which it can be shown that the affiliate provided a given coupon code to a given user who then used that coupon code in a transaction with the merchant. Demonstrating this connection to the merchant is one of the functions of the affiliate-networks.

Affiliate-networks are used, in some use cases, because many coupon codes are not affiliate specific and are shared across multiple affiliates, as the merchant often desires the widest distribution of a relatively easily remembered coupon code. Accordingly, in some use cases, the merchant, affiliate network, and affiliate cooperate to use client-side storage to indicate the identity of the affiliate that provided a given coupon code to a user. To this end, in some embodiments, when a webpage offers interface is presented by the offers engine 12 in the web browsers 50 or 54, that webpage is configured by the offers engine 12 to include instructions to engage the affiliate network server 44 or 46 when a user selects an offer, for example, by clicking on, touching, or otherwise registering a selection of an offer. The website provided by the offers engine 12 responds to such a selection by, in some embodiments, transmitting a request to the appropriate affiliate-network server 44 or 46 (as identified by, for example, an associated uniform resource locator (URL) in the webpage) for a webpage or portion of a webpage (e.g., browser-executable content). The request to the affiliate-network server may include (e.g., as parameters of the URL) an identifier of the affiliate, the offer, and the merchant, and the returned content from the affiliate-network server may include instructions for the web browser 50 or 54 to store in memory (e.g., in a cookie, or other form of browser-accessible memory, such as a SQLite database or in a localStorage object via a localStorage.setItem command) an identifier of the affiliate that provided the offer that was selected.

The webpage from the offers engine 12 (or the content returned by the affiliate network server 44 or 46) may further include browser instructions to navigate to the website served by the merchant server 38, 40, or 42 of the merchant associated with the offer selected by the user, and in some cases to the webpage of the item or service associated with the offer selected by the user. When a user applies the offer, for example by purchasing the item or service or purchasing the item or service with the coupon code, the merchant server 38, 40, or 42 may transmit to the user device upon which the item was purchased browser instructions to request content from the affiliate network server 44 or 46, and this requested content may retrieve from the client-side memory the identifier of the affiliate, such as the operator of the offers engine 12, who provided the information about the offer to the user. The affiliate network may then report to the merchant the identity of the affiliate who should be credited with the transaction, and the merchant may compensate the affiliate (or the affiliate network may bill the merchant, and the affiliate network may compensate the affiliate), such as the operator of the offers engine 12. Thus, the affiliate network in this example acts as an intermediary, potentially avoiding the need for cross-domain access to browser memory on the client device, a feature which is generally not supported by web browsers for security reasons. (Some embodiments may, however, store in client-side browser-accessible memory an identifier of the affiliate upon user selection of the offer, with this value designated as being accessible via the merchant's domain, and provide the value to the merchant upon a merchant request following acceptance of the offer, without passing the identifier through an affiliate network, using a browser plug-in for providing cross-domain access to browser memory or a browser otherwise configured to provide such access.)

A similar mechanism may be used by the native application 52 for obtaining compensation from merchants. In some embodiments, the native application 52 includes or is capable of instantiating a web browser, like the web browser 50, in response to a user selecting an offer presented by the native application 52. The web browser instantiated by the native application 52 may be initialized by submitting the above-mentioned request for content to the affiliate-network server 44 or 46, thereby storing an identifier of the affiliate (i.e., the entity operating the offers engine 12 in this example) in client-side storage (e.g., in a cookie, localStorage object, or a database) of the mobile user device 28, and thereby navigating that browser to the merchant website. In other use cases, the operator of the offers engine 12 has a direct relationship with the merchant issuing the offer, and the selection of an offer within the native application 52 or the desktop or mobile website of the offers engine 12 (generally referred to herein as examples of an offer interface) may cause the user device to request a website from the associated merchant with an identifier of the affiliate included in the request, for example as a parameter of a URL transmitted in a GET request to the merchant server 38, 40, or 42 for the merchant's website.

Administrator device 36 may be a special-purpose application or a web-based application operable to administer operation of the offers engine 12, e.g., during use by employees or agents of the entity operating the offers engine 12. In some embodiments, the administration module 22 may communicate with the administrator device 36 to present an administration interface at the administrator device 36 by which an administrator may configure offers interfaces presented to users by the offers engine 12. In some embodiments, the administrator may enter offers into the offers engine 12; delete offers from the offers engine 12; identify offers for prominent placement within the offers interface (e.g., for initial presentation prior to user interaction); moderate comments on offers; view statistics on offers, merchants, or users; add content to enhance the presentation of offers; or categorize offers.

Thus, the offers engine 12, in some embodiments, operates in the illustrated environment by communicating with a number of different devices and transmitting instructions to various devices to communicate with one another. The number of illustrated merchant servers, affiliate network servers, third-party servers, user devices, and administrator devices is selected for explanatory purposes only, and embodiments are not limited to the specific number of any such devices illustrated by FIG. 1.

The offers engine 12 of some embodiments includes a number of components introduced above that facilitate the discovery of offers by users. For example, the illustrated API server 16 may be configured to communicate data about offers via an offers protocol, such as a representational-state-transfer (REST)-based API protocol over hypertext transfer protocol (HTTP). Examples of services that may be exposed by the API server 18 include requests to modify, add, or retrieve portions or all of user profiles, offers, or comments about offers. API requests may identify which data is to be modified, added, or retrieved by specifying criteria for identifying records, such as queries for retrieving or processing information about particular categories of offers, offers from particular merchants, or data about particular users. In some embodiments, the API server 16 communicates with the native application 52 of the mobile user device 28 or the third-party offer server 34.

The illustrated web server 18 may be configured to receive requests for offers interfaces encoded in a webpage (e.g. a collection of resources to be rendered by the browser and associated plug-ins, including execution of scripts, such as JavaScript™, invoked by the webpage). In some embodiments, the offers interface may include inputs by which the user may request additional data, such as clickable or touchable display regions or display regions for text input. Such inputs may prompt the browser to request additional data from the web server 18 or transmit data to the web server 18, and the web server 18 may respond to such requests by obtaining the requested data and returning it to the user device or acting upon the transmitted data (e.g., storing posted data or executing posted commands). In some embodiments, the requests are for a new webpage or for data upon which client-side scripts will base changes in the webpage, such as XMLHttpRequest requests for data in a serialized format, e.g. JavaScript™ object notation (JSON) or extensible markup language (XML). The web server 18 may communicate with web browsers, such as the web browser 50 or 54 executed by user devices 30 or 32. In some embodiments, the webpage is modified by the web server 18 based on the type of user device, e.g., with a mobile webpage having fewer and smaller images and a narrower width being presented to the mobile user device 30, and a larger, more content rich webpage being presented to the desk-top user device 32. An identifier of the type of user device, either mobile or non-mobile, for example, may be encoded in the request for the webpage by the web browser (e.g., as a user agent type in an HTTP header associated with a GET request), and the web server 18 may select the appropriate offers interface based on this embedded identifier, thereby providing an offers interface appropriately configured for the specific user device in use.

The illustrated ingest module 20 may be configured to receive data about new offers (e.g., offers that are potentially not presently stored in the data store 24), such as data feeds from the affiliate network servers 44 and 46, identifications of offers from user devices 28, 30, or 32, offers identified by third-party offer server 34, offers identified by merchant servers 38, 40, or 42, or offers entered by an administrator via the administrator device 36. In some embodiments, the ingest module 20 may respond to receipt of a record identifying a potentially new offer by querying the data store 24 to determine whether the offer is presently stored. Upon determining that the offer is not presently stored by the data store 24, the ingest module 20 may transmit a request to the data store 24 to store the record. In some cases, the data about new offers may be an affiliate data-feed from an affiliate network containing a plurality of offer records (e.g., more than 100), each record identifying offer terms, a merchant, a URL of the merchant associated with the offer, a product description, and an offer identifier. The ingest module 22 may periodically query such data-feeds from the affiliate-network servers 44 or 46, parse the data-feeds, and iterate through (or map each entry to one of a plurality of processes operating in parallel) the records in the data-feeds. Bulk, automated processing of such data-feeds is expected to lower operating costs of the offers engine 12.

The administration module 22 may provide an interface by which an administrator operating the administrator device 36 curates and contextualizes offers. For example, the administration module 22 may receive instructions from administrator that identify offers to be presented in the offer interface prior to user interaction with the offer interface, or offers to be presented in this initialized offers interface for certain categories of users, such as users having certain attributes within their user profile. Further, in some embodiments, the administration module 22 may receive data descriptive of offers from the administrator, such as URLs of images relevant to the offer, categorizations of the offer, normalized data about the offer, and the like.

The illustrated data store 24, in some embodiments, stores data about offers and user interactions with those offers. The data store 24 may include various types of data stores, including relational or non-relational databases, document collections, hierarchical key-value pairs, or memory images, for example. In this embodiment, the data store 24 includes a user data store 56, a session data store 58, an offers data store 60, and an analytics data store 62. These data stores 56, 58, 60, and 62 may be stored in a single database, document, or the like, or may be stored in separate data structures.

In this embodiment, the illustrated user data store 56 includes a plurality of records, each record being a user profile and having a user identifier, a list of offers (e.g., identifiers of offers) identified by the user as favorites, a list of categories of offers identified by the user as favorites, a list of merchants identified by the user as favorites, account information for interfacing with other services to which the user subscribes (e.g., a plurality of access records, each record including an identifier of a service, a URL of the service, a user identifier for the service, an OAuth access token credential issued by the service at the user's request, and an expiration time of the credential), a user password for the offers engine 12, a location of the user device or the user (e.g., a zip code of the user), and a gender of the user. In some embodiments, each user profile includes a list of other users identified by the user of the user profile as being people in whose commentary on, or curation of, offers the user is interested, thereby forming an offers-interest graph. In some embodiments, users have control of their data, including what is stored and who can view the data, and can choose to opt-in to the collection and storage of such user data to improve their experience with the offers engine 12.

In this embodiment, the session data store 58 stores a plurality of session records, each record including information about a session a given user is having or has had with the offers engine 12. The session records may specify a session identifier, a user identifier, and state data about the session, including which requests have been received from the user and what data has been transmitted to the user. Session records may also indicate the IP address of the user device, timestamps of exchanges with the user device, and a location of the user device (e.g., retail store or aisle in a retail store in which the user device is located).

The illustrated offers data store 60, in some embodiments, includes a plurality of offer records, each offer record may identify a merchant, offers by that merchant, and attributes of the relationship with the merchant, e.g., whether there is a direct relationship with the merchant by which the merchant directly compensates the operator of the offers engine 12 or whether the merchant compensates the operator of the offers engine 12 via an affiliate network and which affiliate network. The offers by each merchant may be stored in a plurality of merchant-offer records, each merchant-offer record may specify applicable terms and conditions of the offer, e.g., whether the offer is a discount, includes free or discounted shipping, requires purchase of a certain number of items, is a rebate, or is a coupon (which is not to suggest that these designations are mutually exclusive). In records in which the offer is a coupon, the record may further indicate whether the coupon is for in-store use (e.g. whether the coupon is associated with a printable image for presentation at a point-of-sale terminal, a mobile device-displayable image, or other mediums) or whether the coupon is for online use and has a coupon code, in which case the coupon code is also part of the merchant-offer record. The merchant-offer records may also include an expiration date of the offer, comments on the offer, rankings of the offer by users, a time at which the offer was first issued or entered into the offers engine 12, and values (e.g., binary values) indicating whether users found the offer to be effective, with each value or ranking being associated with a timestamp, in some embodiments. The values and rankings may be used to calculate statistics indicative of the desirability of the offer and likely success of accepting the offer. The timestamps associated with the values, rankings, and time of issuance or entry into the offers engine 12 may also be used to weight rankings of the offer, with older values being assigned less weight than newer values and older offers being ranked lower than newer offers, all other things being equal, as many offers expire or have a limited number of uses.

The illustrated analytics data store 62 may store a plurality of records about historical interactions with the offers engine 12, such as aggregate statistics about the performance of various offers. In some embodiments, the analytics data store 62 stores a plurality of transaction records, each transaction record identifying an offer that was accepted by a user at a merchant, the merchant, the time of presentation of the offer to the user, and an indicator of whether the merchant has compensated the entity operating the offers engine 12 for presentation of the offer to the user. Storing and auditing these transaction records is expected to facilitate relatively accurate collection of payments owed by merchants and identification of future offers likely to lead to a relatively high rates of compensation for prominent presentation based on past performance of offers having similar attributes.

The cache server 23 stores a subset of the data in the data store 24 that is among the more likely data to be accessed in the near future. To facilitate relatively fast access, the cache server 23 may store cached data in relatively high speed memory, such as random access memory or a solid-state drive. The cached data may include offers entered into the offers engine 12 within a threshold period of time, such as offers that are newer than one day. In another example, the cache data may include offers that are accessed with greater than a threshold frequency, such as offers that are accessed more than once a day, or offers accessed within the threshold, such as offers accessed within the previous day. Caching such offer data is expected to facilitate faster access to offer data than systems that do not cache offer data.

The illustrated control module 14, in some embodiments, controls the operation of the other components of the offers engine 12, receiving requests for data or requests to add or modify data from the API server 16, the web server 18, the ingest module 20, and the administration module 22, and instructing the data store 24 to modify, retrieve, or add data in accordance with the request. The control module 14 may further instruct the cache server 23 to modify data mirrored in the cache server 23. In some embodiments, the cache server 23 may be updated hourly, and inconsistent data may potentially be maintained in the cache server 23 in order to conserve computing resources.

The illustrated components of the offers engine 12 are depicted as discrete functional blocks, but embodiments are not limited to systems in which the functionality described herein is organized as illustrated by FIG. 1. The functionality provided by each of the components of the offers engine 12 may be provided by software or hardware modules that are differently organized than is presently depicted, for example such software or hardware may be intermingled, broken up, distributed (e.g. within a data center or geographically), or otherwise differently organized.

Figure 2:
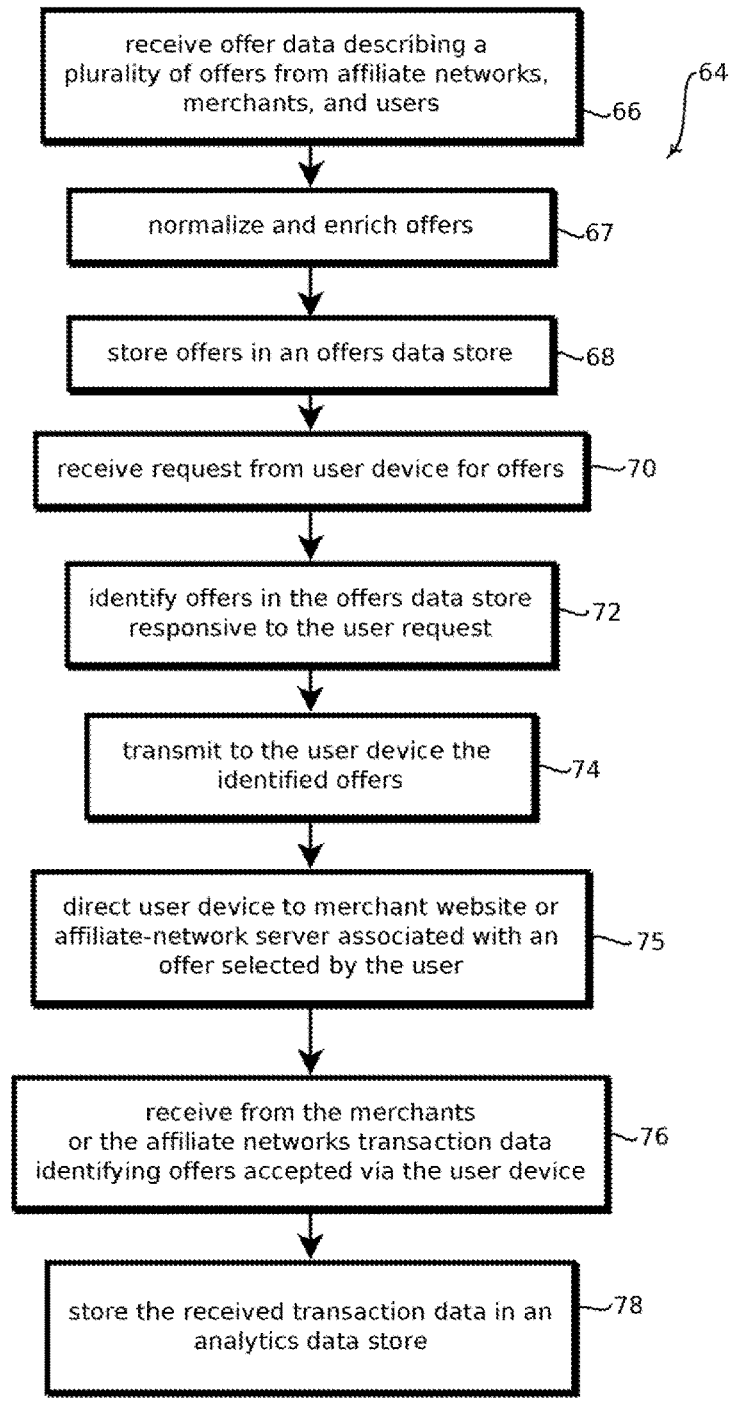
FIG. 2 illustrates an example of a process by which an offers engine in the offer-discovery system of FIG. 1, in some embodiments, obtains and processes data related to offers.

FIG. 2 is a flowchart of a process 64 for acquiring data related to offers within some embodiments of the offer engine 12 discussed above. In this embodiment, the process 64 begins with receiving offer data describing a plurality of offers from affiliate networks, merchants, and users, as illustrated by block 66. This step may be performed by the above-mentioned ingest module 20. As noted above, the received offer data may be received from one or all of these sources. The received offer data may be received via an offer interface by which users associated with these sources enter data about offers, or the received offer data may be received in a predefined format, such as a serialized data format, in an automatic data feed pushed or pulled periodically or in response to the availability of new data from affiliate networks or merchants. Receiving the offer data may include determining whether the offer data is redundant to offer data already received and normalizing the offer data.

The process 64, in some embodiments, includes normalizing and enriching the offer data, as indicated by block 67. Normalizing may include normalizing field names of the data and normalizing the way in which dates are expressed, for example. Enriching may include associating images with the offers for presentation with the offers and adding metadata to the offers to assist users searching for offers.

Next, in the present embodiment, the received offer data is stored in an offer data store, as indicated by block 68. Storing the offer data in the offer data store may include identifying a merchant to which the offer pertains and storing the offer in a merchant-offer record associated with that merchant. Further, some embodiments may include inserting the offer in order in a sorted list of offers for relatively fast retrieval of offers using a binary search algorithm or other techniques to facilitate relatively quick access to data that has been preprocessed (e.g., using a prefix trie). In some embodiments, storing the received offer may further include updating hash tables by which the offer may be retrieved according to various parameters, each hash table being associated with one parameter and including a hash key value calculated based on the parameter and paired with an address of the offer. Such hash tables are expected to facilitate relatively fast access to a given offer as the need to iterate through potentially all offers meeting certain criteria may be potentially avoided.

In some embodiments, the process 64 further includes receiving a request from a user device for offers, as indicated by block 70. The request may specify criteria for identifying offers, such as categories of offers, search terms for offers, or requests for offers designated as favorites.

Next, the present embodiment includes identifying offers in the offer data store responsive to the user request, as indicated by block 72. Identifying offers in the offer data store may be performed by the above-mentioned control module 14 (FIG. 1) by constructing a query to the offer data store 60 based on a request received from the web server 18 or the API server 16. The query may be transmitted to the offer data store 60, or to the cache server 26, each of which may return responsive records.

Next, the identified offers are transmitted to the user device, as indicated by block 74. Transmitting the identified offers may include transmitting the identified offers in an offer interface, such as a webpage, or an API transmission to a native mobile application, for example by the web server 18, or the API server 16 of FIG. 1, respectively.

The device receiving the identified offers may, in response, perform a process described below with reference to FIG. 3 by which additional offers are requested or an offer is selected and a purchase is executed. This process of FIG. 3 and steps 70 through 74 of FIG. 2 may be repeated numerous times, in some use cases, before advancing to the next steps. Further, the steps 66 through 68 may be repeated numerous times independently of (e.g., concurrent with) the performance of steps 70 through 74 of FIG. 2 (which is not to suggest that other steps described herein may not also be executed independently). That is, the process 64 may undergo step 60 and 68, for example, 50 times within a given time, while performing steps 70 through 74 500 times within that given time, and performing the remaining steps of process 64 a single time.

Figure 3:
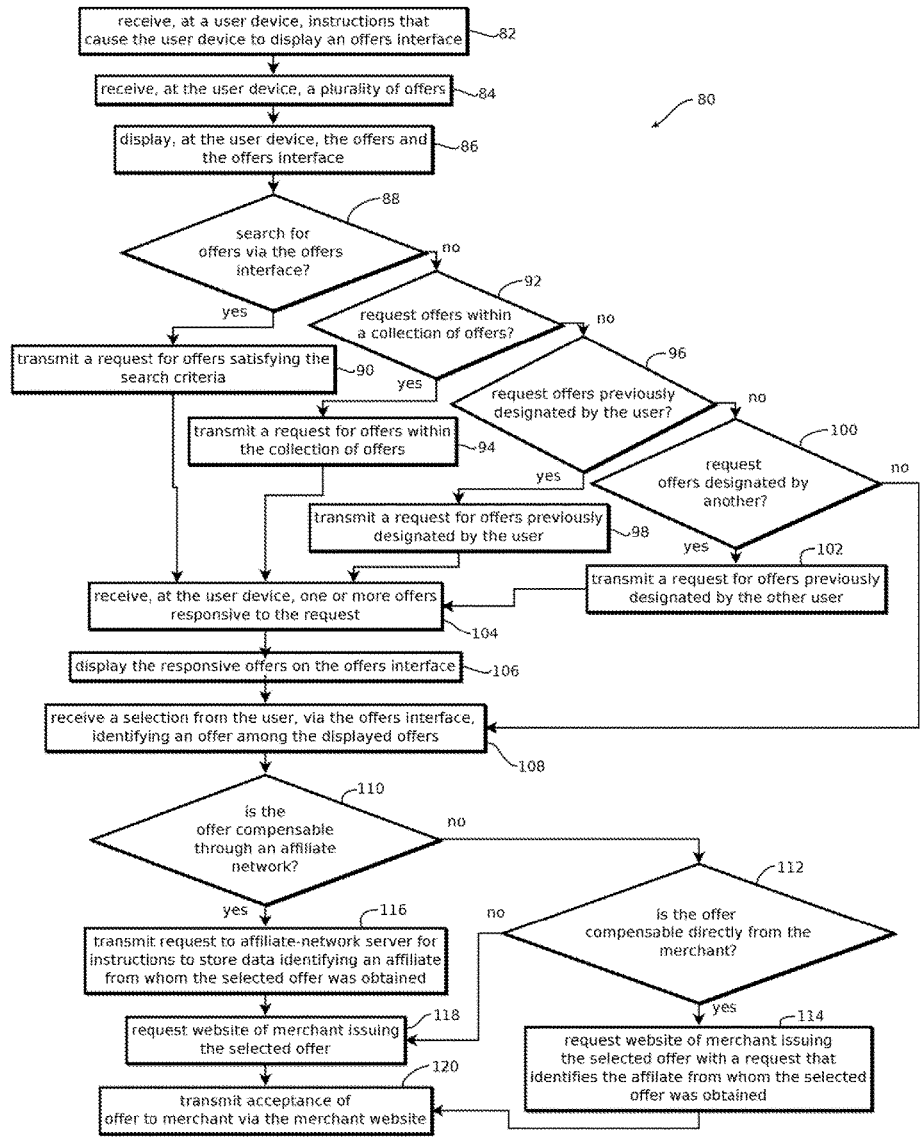
FIG. 3 illustrates an example of a process by which a user device in the offer-discovery system of FIG. 1, in some embodiments, obtains and presents to users data related to offers.

In some embodiments, a user device undergoing the process of FIG. 3 may indicate to an offers engine that the user has selected an offer (e.g., by clicking on or touching a selectable element in an offers interface associated with the offer). In response, the offers engine may direct the user device to an affiliate-network server or a merchant server associated with the offer, as illustrated by block 75.

Next, this embodiment of the process 64 includes receiving from merchants or affiliate networks transaction data identifying offers accepted via the user device, as illustrated by block 76. The transaction data may be pulled from these sources, for example, by the ingest module 20 of FIG. 1, periodically, or in response to some threshold number of transactions having occurred.

Next, in this embodiment, the receipt transaction data may be stored in an analytics data store, as indicated by block 78. In some embodiments, this data may be stored in the analytics data store 62 of FIG. 1. Storing the transaction data is expected to facilitate the identification of attributes of relatively profitable offers, as the transaction data indicates which offers historically yielded compensable transactions. Further, storing the transaction data is expected to facilitate relatively accurate auditing of payments from merchants or affiliate networks.

FIG. 3 is a flowchart of an embodiment of a process 80 that provides an example of an offer interface at a user device. The process 80 may be performed by the above-mentioned native application 52 or web browser 50 or 54 in cooperation with the offers engine 12.

Some embodiments of process 80 begin with receiving, at a user device, instructions that cause the user device to display an offers interface, as indicated by block 82. The received instructions may be in the form of a downloaded native application, such as one downloaded from an application store hosted by a provider of mobile devices, or the received instructions may be in the form of a website received from the offers engine 12 and rendered in a browser of the user device.

In some embodiments, the process 80 further includes receiving, at the user device, a plurality of offers, as indicated by block 84, and displaying, at the user device, the offers in the offer interface, as indicated by block 86. The offers may be received at approximately the same time the instructions of step 82 are received, for example along with a webpage, or the offers may be received at a later date, for example during a session subsequent to downloading the native application.

The offers interface may include inputs by which the user may search, filter, or otherwise browse offers having various attributes. Some of these interfaces are described below with reference to steps performed to determine whether the user has engaged these inputs. In some embodiments, determining whether the user has engaged these inputs may be performed by an event handler executed by the user device, the event handler causing the user device to perform the corresponding, below-described requests to the offers engine 12 based on the type of event, e.g., whether the user touched, clicked, or otherwise selected a particular button on the offers interface.

Illustrated process 80 includes determining whether the user is searching for offers, as indicated by block 88. With the offers interface, the user may express their intention to search for offers by entering search terms in a text entry box and selecting a button to request a search in accordance with the entered search term. Upon selecting this button, the user device may transmit a request for offers satisfying the entered search criteria, as indicated by block 90. The transmitted request may be in the form of a GET request or an API call to the web server 18 or the API server 16 of the offers engine 12 of FIG. 1.

In some embodiments, the process 80 further includes determining whether the user requests offers within a collection of offers, as indicated by block 92. The offers interface may include selectable inputs that identify the collections, such as clickable collection names, collection selection buttons, or collection selection tabs. Examples of collections include categories of goods or services, such as sporting goods, house-wares, groceries, and the like; collections of modes of coupon redemption, such as in-store coupon redemption and online coupon redemption; collections based on offer statistics, such as newest offers, most popular offers, highest ranked offers; collections of offers designated by a user or other users; or collections based the value conferred by the offer, such as discounts, free shipping, rebates, and referral fees. Upon determining that the user has requested offers within a collection, the user device may transmit a request for offers within the collection to the offers engine 12, as indicated by block 94, which may return data responsive to the request.

In some embodiments, the process 80 includes determining whether the user requests offers previously designated by the user, as indicated by block 96. In some embodiments, the offers interface may include an input by which a user can designate an offer, such as designating offers as being a user favorite, designating offers as being ranked in a particular fashion, or designating offers as likely being of interest to some other user, such as users adjacent one another in a social graph. The offers interface may include an input for a user to make designations, such as a user selectable input labeled "add to my favorites" or "add to my wallet," and an input for a user to request offers having a designation, such as a user selectable input labeled "view my favorites" or "view my wallet." Upon determining that the user made such a request, the process 80 includes transmitting a request for the offers previously designated by the user, as indicated by block 88. The transmission may be made to the offers engine 12, to the API server 16 or the web server 18, as described above with reference to FIG. 1, and may include an identification of the designation and the user.

The process 80, in some embodiments, further includes determining whether the user requests offers previously designated by another user, as indicated by block 100. The offers interface, in some embodiments, may include an input by which a user makes such a request, such as a user selectable input labeled "offers recommended by my friends." Upon determining that the user has made such a request, the process 80 transmits a request for offers previously designated by the other user (or users), as indicated by block 102. Again, the transmission may be to the offers engine 12 of FIG. 1, which may store or otherwise have access to offers designated by other users and a social graph of the user by which responsive offers are identified. Further, the offers interface may include an input by which the user may view identifiers of other users and add the other users to an offer-interest graph of the user. This offer interest graph may be referenced by the offers engine 12 to identify offers in response to the request of step 102.

The process 80 further includes, in some embodiments, receiving, at the user device, one or more offers responsive to the request, as indicated by block 104, and displaying the responsive offers on the offers interface, as indicated by block 106.

In some embodiments and some use cases, a selection from the user is received via the offers interface, thereby identifying an offer among the displayed offers, as indicated by block 108. In some embodiments, each of the offers may be displayed with an associated input by which the user selects the offer, such as a touchable or clickable button, region, or text. The selection, in some embodiments, may cause the offers interface to request additional data from the offers engine, such as instructions from the offers engine to navigate to an affiliate-network server associated with the offer or to navigate to a merchant server associated with the offer. In other embodiments, such instructions may be present within the offers interface, e.g., in the form of URLs linking to these servers.

The process 80 further includes determining whether the selected offer is compensable through an affiliate network, as indicated by block 110. This determination may be made by the offers engine 12, in some embodiments, for each of the offers being displayed prior to transmission of the offers to the user device. For example, each offer may be associated with a designation indicating whether the offer is compensable in this fashion, and the designation may be transmitted along with the offer, for instance, by associating the offer with HTML or JavaScript™ that so designate the offer, or by including a field including the designation in a response to an API call for each offer. The user device, in some embodiments, may take different actions depending on the designation associated with the selected offer.

Upon determining that the selected offer is not compensable through an affiliate network, the process 80 of this embodiment includes determining whether the selected offer is compensable directly from the merchant associated with the offer, as indicated by block 112. Again, the determination of block 112 may be performed, in some embodiments, by the offers engine 12 for each of the offers being displayed prior to transmission of the displayed offers, and each displayed offer may be associated with a designation based on the results of the determination, such as different HTML or JavaScript™ or a different field value in an API response. The user device may take different actions depending on this designation.

Upon determining that the selected offer is not compensable directly from the merchant, the process 80 may proceed to block 118 described below. Upon determining that the selected offer is compensable, the process 80, in this embodiment, may proceed to request the website of the merchant issuing the selected offer with a request that identifies the affiliate from whom the selected offer was obtained, as indicated by block 114. The request may be in the form of a URL having as a parameter an identifier of the entity operating the offer engine 12, thereby indicating to the merchant that the affiliate should be compensated in accordance with an arrangement between the merchant and the affiliate. Upon performance of step 114, the process 80 of the present embodiment proceeds to step 120 described below.

As indicated by block 110, upon determining that the selected offer is compensable through an affiliate network, the process 80 proceeds to transmit a request to the affiliate-network server for instructions to store data identifying an affiliate from whom the selected offer was obtained, as indicated by block 116. This request may be a request for content from the affiliate-network server that is not displayed to the user, or is not displayed to the user for an appreciable amount of time (e.g., less than 500 ms), and the request may include an identifier of the affiliate, the merchant, and the offer. The requested content may cause the user device to store in persistent memory of the browser of the user device (e.g., memory that lasts between sessions, such as a cookie or a database of the browser) an identifier of the affiliate operating the offers engine 12. This value may be retrieved later by the affiliate-network at the instruction of the merchant upon the user accepting the offer, for example by the user using a coupon code associated with the offer at the merchant, thereby allowing the merchant (or the affiliate network) to identify the appropriate party to compensate for the sale.

Upon transmitting the request the affiliate network server, the process 80 further includes requesting the website of the merchant issuing the selected offer, as indicated by block 118, and transmitting acceptance of the offer to the merchant via the merchant's website, as indicated by block 120. Accepting the offer, as noted above, may cause the merchant to compensate the affiliate operating the offers engine 12.

The process 80 of FIG. 3 is expected to facilitate relatively fast access to offers that are likely to be relevant to a user, as each of the determinations of step 88, 92, 96, and 100 provide different paths by which the user can specify offers in which the user is likely to be interested. Further, the determinations of step 110 and 112 provide dual mechanisms by which the operator of the offers engine 12 can be compensated, thereby potentially increasing revenue.

Figure 4:
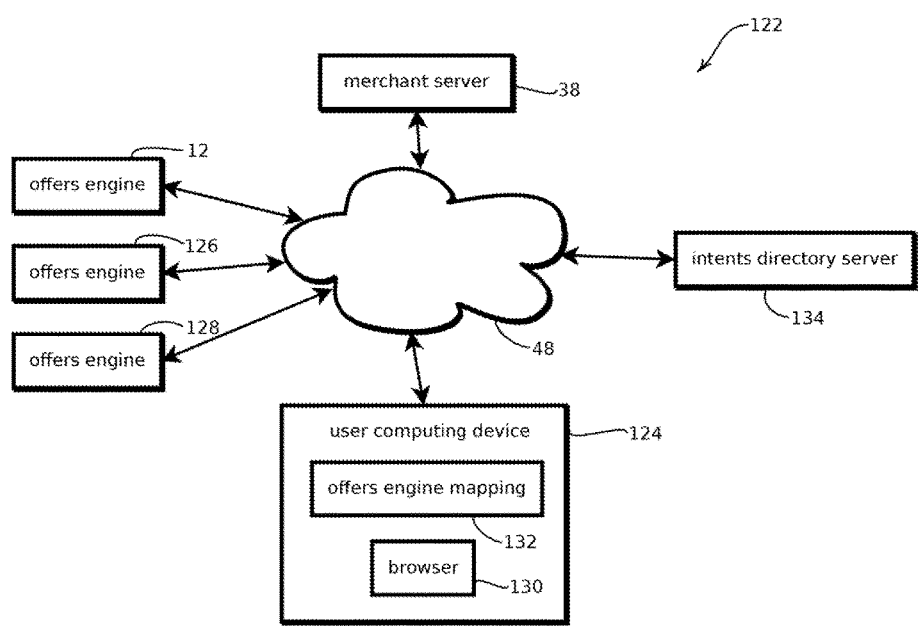
FIG. 4 illustrates an embodiment of an offer-discovery system configured to assist users with the selection of an offer engine by mapping an offer engine to an offers intent token embedded in offer-bearing content.

FIG. 4 illustrates an offer-discovery system 122 that is configured to assist users with the selection of an offers engine by mapping all or part of an offers engine (which may include mapping an interface for the same) to an offers intent token, which may be embedded in websites, programs, applications, or other content relevant to offers. For example, an offers intent token may be embedded in a mobile website of an offers engine, a checkout website of a merchant, an application or program of a server at a point-of-sale, or even an application on another user's device that is capable of transmitting content relevant to offers. As explained in greater detail below, upon detecting the presence of (or selection of) the offers intent token, user devices may reference the mapping to determine which offers engine a user has selected for handling intents related to offers, and instantiate an offers interface of the selected offers engine, thereby relieving the user of the burden of navigating to, or launching, the offers interface of their preferred offers engine. As explained below, the mapping of intents to offers engines may be performed by an operating system of the user computing device, e.g., in memory of a browser or in registry settings, depending on the embodiment. Various types of offers engine intents may be used, e.g., some may map to an offers engine generally (e.g., either in a web browser or a native application) and some may map specifically to a native application for interfacing with an offers engine, as described below. And the offers intent may be expressed with various techniques, including as HTML tags, or as a URI that is mapped to a native application during installation of the native application.

Mapping all or part of an offers engine to an offers intent, such as a URI, token, or other string, may include recording in memory a one-to-one correlation between the offers intent and a selected offers engine to be engaged upon processing of the offers intent, e.g., programmatically opening a URI. In such mappings, in some cases, one and only one offers engine corresponds to a given intent, but not necessarily vice versa: in some cases, the mapping may include a one-to-many correlation, associating multiple types of intents to a single offers engine. The mapping may be stored in memory of a user device, e.g., in a registry of the user device or preferences settings of the user device, or such mappings may be stored remotely, e.g., on a server that is accessed with reference to a user account to determine the mapping across a plurality of user devices. This mapping may be stored in memory designated in code that effectuates intents, such that the mapping may be referenced when the intent is processed.

The offer-discovery system 122 may include all or a subset of the components of the offer-discovery system 10 of FIG. 1. In this embodiment, the merchant server 38, offers engine 12, and network 48 are illustrated. The system 122 also includes a user computing device 124 operable to detect intent tokens (or selection of the same by a user) signaling an offers intent, ascertain which offers engine is mapped to the intent token (or solicit such a mapping from the user), and in response, instantiate an instance of an offers interface of the mapped offers engine, for example, by launching a native application for interfacing with the mapped offers engine, requesting a website in a browser from the mapped offers engine, or making an API call to the mapped offers engine. As illustrated by FIG. 4, the exemplary system 122 includes multiple offers engines 12, 126, and 128, each of which may include some or all of the features of the offer engine 12 described above, and one or more of which may be mapped to handle offers intents in webpages or other content.

In some embodiments, the user computing device 124 includes a browser 130 with which the user may navigate to various websites available through the network 48, including a website of the merchant server 38. As explained in greater detail below, the browser 130 may be configured to render webpages of the merchant received from the merchant server 38, and in the process of rendering these webpages, detect the presence of an offers intent token, such as an intent HTML tag embedded in the webpage. In general, intents are asynchronous messages that request functionality, such as the functionality provided by an offers engine, though some embodiments may handle intents synchronously. The requested functionality, when processed asynchronously, may be performed while the process that requested the functionality operates concurrently. Requests for such functionality may be included in websites or other content in which such functionality is likely to be relevant to a user, for example within a checkout page of the merchant. In some embodiments, the checkout page includes an intent token selectable by the user to request functionality of an offers engine, and in particular, the functionality of a specific offers engine previously mapped for handling offers intents. In some embodiments, the merchant webpage may include a user-selectable icon, for example, labeled "check for coupons," and that user selectable icon may be associated with an offers intent by which the user's preferred offers engine may be engaged.

In another example of content that may include an offers intent, a website (which includes embedded web content, such as an i-frame) hosted by the offers engines 12, 126, or 128 may include an offers intent tag. The offers intent tag may be mapped to a native application for interfacing with the offers engines 12, 126, or 128, and upon detecting the presence of the offers intent tag, the user may be presented by the browser with the option of interacting with the user's preferred offers engine 12, 126, or 128 via the native application, rather than the website interface of the offers engine 12, 126, or 128. Accepting the option may cause the native application to launch, and declining the option may allow the user to continue using the webpage. In certain use cases, native applications are more responsive than websites, as the native applications may use hardware acceleration of graphics to provide a more aesthetically pleasing and intuitive interface. The intents tag, in some embodiments, may prompt the browser to present the user with the option of installing the native application in cases in which the native application is not presently installed, or the intents tag may be ignored in some embodiments in which no mapping has occurred.

The offers intent is stored, in some embodiments, in an offers engine mapping 132, which may map an offers intent to a particular offers engine 12, 126, or 128 (e.g., a native application or website for presenting an interface to such an offers engine). The offer engine mapping 132 may be stored, for example, in memory of the browser, or in memory accessible to the operating system of the user computing device 124 generally. For instance, the mapping may be stored in a registry of the user computing device 124. The mapping may include a key-value pair in which the key identifies the type of intents tag, in this case an offers intent, and the value identifies an offers engine to handle the intent. The browser 130 may request the value of the offers engine mapping 132 in response to a user requesting to view an offers interface from the merchant website. The browser 130 may also be configured to instantiate an offers interface, for example, by launching a native application or requesting a webpage, for the offers engine identified by the offers engine mapping 132.

The offers interface instantiated as a result of the user selecting the intent may be initialized based on data conveyed with the request to instantiate the offers interface. For example, the request may include context data identifying to the offers engine 12 a merchant of the merchant website or an item for sale by the merchant in the user's shopping cart, and the offers engine 12 may initialize the offers interface to include content relevant to this context data, for example, including offers by the merchant, offers by the merchant applying to an item in the user shopping cart on the merchant's website, or offers by merchants selling similar items (for example, in the same category) or the same item. Further, the request for the offers interface may specify a type of action, such as a particular initial state of the offers interface, like an offers interface including search results, an offers interface for sharing the offer with others adjacent the user in a social graph, or an offers interface for rating or commenting on the offer. The offers engine 12 may initialize the offers interface based on this type of action included in the request. In some embodiments, the request to instantiate the offers interface may include the type of action to be performed and the contextual data in a URL requesting a offers interface webpage from the mapped offers engine 12, 126, or 128, or these parameters may be included as arguments in a command launching the native application on the user computing device for interfacing with the mapped offers engine 12, 126, or 128.

The mapping of a particular offers engine to the offers intent may occur as a result of a variety of different user interactions with the user computing device 124, depending upon the embodiment. For example, the user computing device 124 may be a mobile computing device, and the mapping may be performed as a result of the user installing a native application for interfacing with an offers engine on the user computing device 124. Part of the installation process may include setting the value of the offers engine mapping 132, for example, by changing a registry value to indicate that the native application should be launched (or the option of launching should be presented) upon a user selecting an offers intent within a website or other content (or upon the user navigating to a website including the offers intent). In another example, the offers engine mapping 132 may be in memory of the browser 130, and the user may specify an offer engine 12, 126, or 128 to be associated with the offers intent the first time the user selects the offers intent within the browser, e.g., upon the user selecting an offers intent, the browser may first determine whether an offers engine is mapped to the offers intent and, upon determining that no such mapping exists, the browser may present the user with an interface by which the user may select an offers engine to be mapped to the offers intent.

To this end, in some embodiments, the offer-discovery system 122 may include an intents directory server 134 hosting an API by which offer engines 12, 126, and 128 capable of handling a particular intent, such as the offers intent, may be registered for identification to the browser 134 and presentation to the user during the process of selecting an offers engine to be mapped to the offers intent. The intents directory server 134 may receive a query that specifies a type of intent, such as the offers intent, and may respond to the query by returning a list of services capable of handling the intent, such as identifiers of offers engines 12, 126, and 128.

Figure 5:
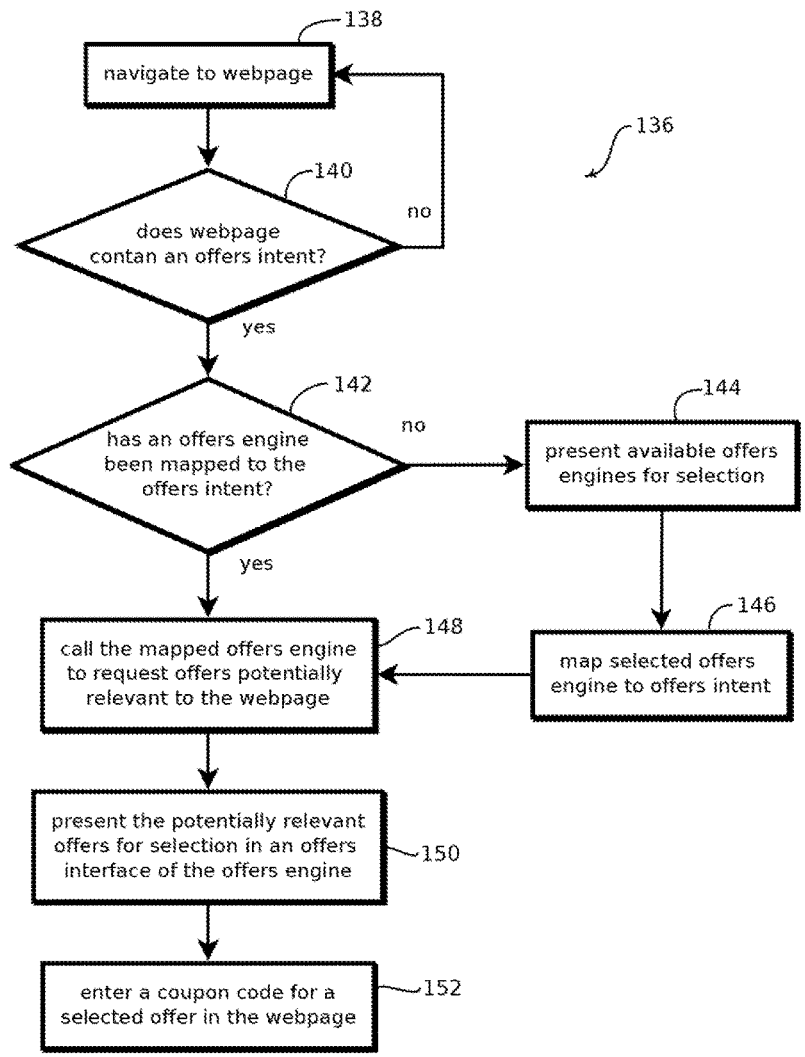
FIG. 5 illustrates an embodiment of a process for facilitating coupon redemption by mapping offers intents to an offers engine.

FIG. 5 is a flowchart of a process 136 by which offers intents are mapped to offers engines and by which user selection of offers intents (or navigating to a web page having such an intent) instantiates an offers interface for communicating with the mapped offers engine. The process 136, in some embodiments, may be performed by the above-mentioned user computing device 124, for example by executing instructions stored in a tangible, machine-readable, non-transitory memory of the user computing device, which may store an operating system, the browser, the offers engine mapping 132, and instructions for performing the process 136.

In some embodiments, the process 136 includes navigating to a webpage. Navigating to the webpage may be performed by the user using the browser on the user computing device 124 described above with reference to FIG. 4, for example. The webpage may be a merchant webpage, such as a merchant webpage having a checkout feature, or a webpage of one of the offers engines 12, 126, or 128 that are also configured to interface with a corresponding native application.

Some embodiments of the process 136 further include determining whether the webpage contains an offers intent, as indicated by decision block 140. Determining whether the webpage contains an offers intent may include parsing HTML encoding portions (or all) of the webpage and detecting the presence of an offers intent token, for example, a bracketed tag including the string "intent" and various parameters, such as an action to be performed, and contextual data, within the webpage. Detecting whether the webpage contains an offers intent may be performed by the browser 130 of the user computing device 124 described above with reference to FIG. 4 upon rendering the webpage or upon user selection of an input associated with the intent. Upon determining that the webpage does not contain an offers intent, the process returns to step 138, and the user navigates to other webpages, each of which the browser may evaluate for an offers intent.

Upon determining that the webpage does contain an offers intent, in some embodiments, the process proceeds to determine whether an offers engine is then mapped to the offers intent, as indicated by block 142. Determining whether an offers engine has been mapped to the offers intent may be performed by the browser 130 of FIG. 4 as part of rendering the webpage. In some embodiments, the browser may query the offer service mapping 132 of user computing device 124 described above with reference to FIG. 4, which may be contained in browser memory or in a registry of the operating system of the user computing device 124.

Upon determining that an offers engine has not been mapped to the offers intent, the process 136, in some embodiments, proceeds to present available offer engines for selection by the user, as indicated by block 144. Alternatively, in some embodiments, upon determining that no offer engine is mapped to the offers intent, the process 136 may terminate, which is not to suggest that other steps described herein may not also be omitted in some embodiments. As noted above, presenting available offer engines for selection to the user may include querying, with the browser 130, an intents directory server 134, each of which is shown in FIG. 4. The user may select among the presented offer engines, and the selected offer engine may be mapped to the offers intent, as indicated by block 146, for example in the offers engine mapping 132 of FIG. 4.

Next, the process 142 includes calling the mapped offers engine to request offers potentially relevant to the webpage, as indicated by block 148. Calling the mapped offers engine may include instantiating an offers interface, such as a webpage from the offers engine or a native application for communicating with the offers engine, and the request to instantiate the offers interface may include an action to be performed by the offers engine and data indicative of the context in which the offers intent is presented (e.g., the identity of a merchant, the type of item on a merchant webpage, or items in a shopping cart of the merchants webpage). Other embodiments may simply instantiate the offers interface to communicate with the mapped offers engine without passing such parameters, e.g., some embodiments in which the offers interface is a native application launched in virtue of the user navigating to a website of the offers engine.

Next, the process 136, in some embodiments, includes presenting the potentially relevant offers for selection by the user in the instantiated offers interface, as indicated by block 150. Presenting the potentially relevant offers for selection may be performed by the offers engine 12 transmitting a webpage to the user computing device 134, the webpage being an offers interface, or by the user computing device launching a native application that requests data about offers via an API server of the offers engine 12, 126, or 128 mapped to the offers intent.

Finally, the process 136, in some embodiments and use cases, includes entering a coupon code in an input for such codes in the webpage. This step may be performed, for example, in some embodiments in which the offers intent occurs within a merchant webpage, such as a merchant checkout page, or the step may be performed by navigating to the merchant webpage within a webview launched by the native application. The coupon code may be entered manually by the user via the browser or the offers interface may assist the user by loading the coupon code to memory of the operating system, such as a clipboard memory or pastebin memory, and pasting the stored coupon code into the input on the merchant webpage at the request of the user, e.g., by entering a paste command after selecting the appropriate input field of a merchant webpage.

Further, in some embodiments, a drag-and-drop interaction may be supported, by which the coupon code may be displayed adjacent the merchant's webpage (e.g., in a header over an i-frame in which the merchant's checkout webpage is rendered), an event handler executing on the user device detects a user selection of a coupon code (e.g., touching or clicking), and code executing on the user device causes an image of the coupon code to be rendered under the area of the screen selected as the selection is translated by the user (e.g., with a dragging or sliding gesture) to an input field in the merchant webpage for receiving the coupon code, at which point the corresponding code is programmatically entered into the input field, e.g., by changing a value attribute of a text input field to be the coupon code. In some cases, the coupon code may be automatically entered into such an input field by code executing on the user device, e.g., JavaScript provided with the above-described header may include an identifier of the input field on the merchant's checkout webpage (e.g., an element id, class, or a keyword associated therewith), and the coupon code may be automatically populated by searching the DOM for the corresponding identifier and changing a value attribute of a responsive element to equal the code. In some cases, other user information, e.g., shipping address and billing information, may be automatically completed in the merchant's webpage using the same approach based on a user profile stored in the offers engine.

The process 136, in some embodiments, is expected to more tightly integrate the experience of shopping with the experience of discovering offers relative to other systems, as users can obtain their preferred offers interface with relatively few user-driven steps, thereby lowering the cognitive load placed on the user when using an offers engine.

In some embodiments, the offers intent may be expressed as a uniform resource identifier (URI) in a webpage or other content (including in a native application by a third party), and the offers intent URI (or a portion of the URI, such as a prefix) may be mapped in memory of the user device to a native application that provides an offers interface. The mapping may be performed as part of the installation process of the native application, and navigating the user device to the offers intent URI (or otherwise interacting with the URI) may cause the user device to launch the mapped native application. Further, in some embodiments, the URI may include arguments to be passed to the native application upon launch. The arguments may include an action to be performed, and parameters of that action, as explained below.

In one embodiment of a process for opening an offers intent, a URI identifying an offers intent may be opened (or otherwise accessed) by the user device. The URI may be accessed by a browser or some other application on the user device, depending on the use case and embodiment. For instance, a user may request a webpage from the offers engine, and the offers engine may respond with a webpage having instructions that cause the browser to access the offers intent URI, e.g., JavaScript that attempts to open the URI. In some embodiments, the user device may first detect whether an offers interface native application is mapped to the offers intent URI, and in response to detecting the mapping, open the native application. In another example, the browser may attempt to open the URI without first detecting if a mapping is stored on the user device. In some cases, the above offers engine may respond to a request to a URL of the offers engine with a URI indicating an offers intent The URI may be provided with instructions to load the webpage in the event that the native application is not installed or is not mapped to the URI.

In some use cases, another native application, e.g., an application related to shopping, may open the offers intent URI. For example, the native application or another native application may attempt to open (or otherwise access) the offers intent URI in response to a particular trigger. In some embodiments, such a trigger may include the detection of a user device at or near a particular location using, for example, a geo-location positioning method. In other embodiments, such a trigger may include the detection of, or a particular communication from, a shortwave or near field communication device. In another embodiment, a native application for scanning bar codes may attempt to open (or otherwise access) a URI for a deals intent in response to a successful scan of a bar code, passing as parameters an identifier of a product from a scan of a bar code performed by the bar-code scanning native application and a requested action to search for related offers. In another example, a native application may attempt to open (or otherwise access) the offers intent URI in response to the detection or recognition of a product through analysis of a digital photo of the product. In another example, a native application for checking-in to merchants' physical retail sites may open the offers intent URI upon a user checking in to a particular site, and the intent URI may include as a parameter an identifier of the merchant for searching for offers by that merchant. In some cases, a user or administrator may instruct the user device to open an offers intent URI, e.g., to configure the offers interface native application or debug the application. In some embodiments, a merchant website may include a URI offers intent (or other form of offers intent), and a web browser rendering the webpage may attempt to open the URI, thereby causing the offers intent to be handled by the designated service.

In some cases, the offers intent URI may be expressed in the following format: scheme://action/parameter-1/parameter-2/ etc. For instance, the offers intent may be "retailmenot://view/topCoupons," in which "retailmenot" is the scheme, "view" is the action, and the collection "topCoupons" is a parameter (which may be referred to as contextual data). Other examples of schemes for intents offers include "coupons," "popularstores," "categories," "store," "coupon," "search," "debug," "offers," "deals," "savings," and the like. The scheme indicates that the intent is an offers intent and is what is mapped by the user device to the native application for viewing an offers interface, in this embodiment. The "actions" field specifies actions to be performed by the offers interface native application, and the actions may be performed based on the parameters. Other examples include viewing featured offers, viewing recommended merchants, sharing a store, sharing an offer, designating an offer as a favorite, submitting an offer, etc.

Other examples of actions include "delete," "update," "favorite," "share," "redeem," "use," "save," "synch," and "apply," each of which may be followed by parameters that indicate the item upon which the action should be performed, e.g., a "coupon," "mobile wallet" or "offer," and a parameter that identifies an instance of the item, such as a coupon identifier. In other examples, the action may be "favorite," followed by parameters that identify a type of item to be added as a favorite and an identifier of a specific instance of the type of item. In another example, the action may be "view," and a parameter may specify a collection to view, such as top coupons or popular stores. Or the action may be "search," and the parameters may identify a field to search (e.g., stores or categories) and search criteria (e.g., search text or category tags). The action may also specify a mode in which to open the native application, e.g., a "debug" action may open the native application in a debug mode. Further, calling the offers intent URI without specifying an action or parameters may cause the native application to open in a default mode.

For instance, a URI of "offers://share/coupon_no_1234" may cause a native application on the client device to be launched and to automatically transmit a request to the offers engine to designate the coupon having the identifier "coupon_no_1234" as being shared in a user profile of the corresponding user. Or a URI of "offers://view/recommended_merchants" may cause the native application to open, request a list of recommended merchants from the offers engine, and display those merchants to the user in an initial state. In another example, a URI of "offers://view/featured_offers" may cause a similar sequence to retrieve and display offers designated as "featured" by an administrator of the offers engine. In some embodiments, a URI of "offers://favorite/coupon_no_1234" may cause the native application to designate the corresponding coupon as being a favorite of the user in a user profile of the offers engine. In another example, a URI of "offers://submit/offer" may cause an offer to be added to the offers stored and provided by the offers engine, e.g., this URI may cause the native application to launch with a form display by which attributes of an offer are entered and submitted by a user, or a sequence of additional parameters may designate such attributes.

Thus, in this embodiment, the mobile user device may respond to an attempt to open the URI (by a browser or other application) by launching the native application for interfacing with the offers engine.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes," and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms relating to causal relationships, e.g., "in response to," "upon," "when," and the like, encompass causal relationships having both causes that are a necessary causal condition and causes that are a sufficient causal condition, e.g., "state X occurs upon condition Y obtaining" is generic to "X occurs solely upon Y" and "X occurs upon Y and Z." Similarly, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing or computing device is capable of manipulating or transforming signals, for instance signals represented as physical electronic, optical, or magnetic quantities within memories, registers, or other information storage devices, transmission devices, or display devices of the special purpose computer or similar special purpose processing or computing device.

What is claimed is:

1. A tangible, non-transitory, machine-readable medium storing instructions that, when executed by data processing apparatus, cause the data processing apparatus to perform operations comprising:

installing an offers application on a user device, wherein installing the offers application includes registering the offers application in memory of the user device as a designated application to handle offers intents, the offers intents being asynchronous calls from another application to request services related to offers; and handling, with a processor, an offers intent upon another application accessing the offers intent, wherein handling the offers intent comprises:
   launching the offers application;
   receiving, with the offers application, an action related to offers and specified in the handled offers intent;
   receiving, with the offers application, a parameter related to offers and specified in the handled offers intent; and
   performing, with the offers application, the action based on the parameter.

2. The medium of claim 1, wherein the action is a request to view offers, the parameter identifies an offer, and performing the action comprises displaying the offer with a native offers application.

3. The medium of claim 2, wherein performing the action comprises requesting the offer from an offers engine over a network.

4. The medium of claim 2, wherein the parameter identifies an offer by specifying a merchant and performing the action comprises requesting offers by the merchant.

5. The medium of claim 4, wherein the offers intent is contained in a web page of the merchant, and the offers application is launched by a web browser rendering the web page and accessing a uniform resource identifier in the web page containing the offers intent.

6. The medium of claim 2, wherein the parameter specifies a collection of offers being ranked above a threshold rank.

7. The medium of claim 2, wherein the parameter specifies offers in a category of coupons.

8. The medium of claim 2, wherein the operations comprise:
   handling a different offers intent upon a third application accessing the different offers intent.

9. The medium of claim 1, wherein the other application is operative to identify a merchant or a product by scanning a machine-readable product identifier with an optical sensor of the user device and request, using the offers intent, offers related to the identified merchant or product.

10. The medium of claim 1, wherein the other application is a web browser rendering a web page, and wherein the web browser launches the offers application by accessing a uniform resource identifier contained in the web page.

11. The medium of claim 1, wherein the other application is another native application, the other native application being a non-browser application, and a command in the other native application is a request for the offers intent.

* * * * *